United States Patent [19]

Oltendorf

[11] 4,380,722

[45] Apr. 19, 1983

[54] ACCOMMODATION CIRCUIT FOR A STEP MOTOR

[75] Inventor: Norman E. Oltendorf, Algonquin, Ill.

[73] Assignee: Bodine Electric Company, Chicago, Ill.

[21] Appl. No.: 225,126

[22] Filed: Jan. 14, 1981

[51] Int. Cl.³ .......................................... H02K 29/00
[52] U.S. Cl. .................................... 318/696; 318/685
[58] Field of Search ................................ 318/696, 685

[56] References Cited
U.S. PATENT DOCUMENTS 3,746,958 7/1973 Leenhouts .
3,968,416 7/1976 Leenhouts .
4,145,644 3/1979 Liu .
4,153,866 5/1979 Leenhouts .
4,218,642 8/1980 Johnson .
4,255,696 3/1981 Field .................................... 318/696

Primary Examiner—J. V. Truhe
Assistant Examiner—Saul M. Bergmann
Attorney, Agent, or Firm—Allegretti, Newitt, Witcoff & McAndrews, Ltd.

[57] ABSTRACT

An accommodation circuit for converting the energization pattern provided to a step motor by a logic sequencer is disclosed herein. The circuit provides a series of override signals in response to the clock controlling the logic sequencer. The override signals are combined with the energization signals provided by the logic sequencer to convert the energization pattern to a predetermined alternate pattern.

16 Claims, 5 Drawing Figures

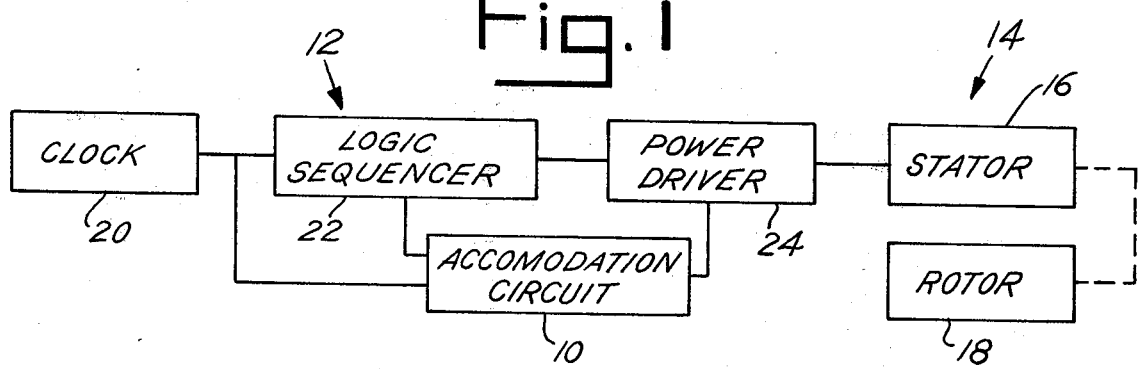
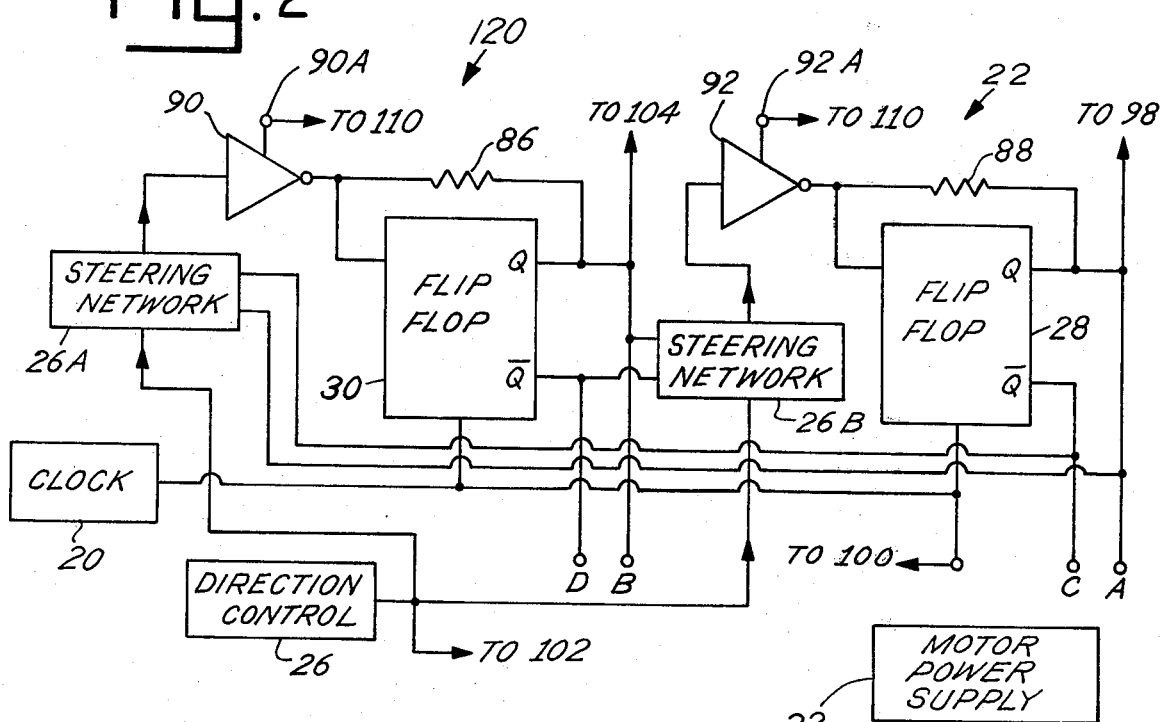
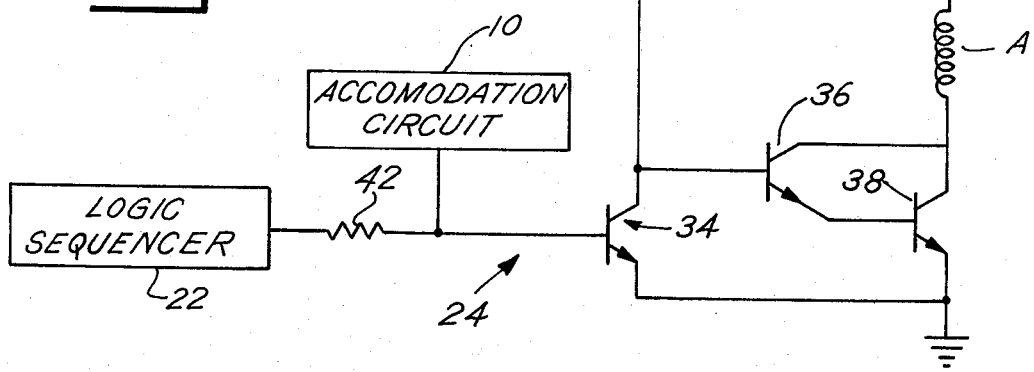

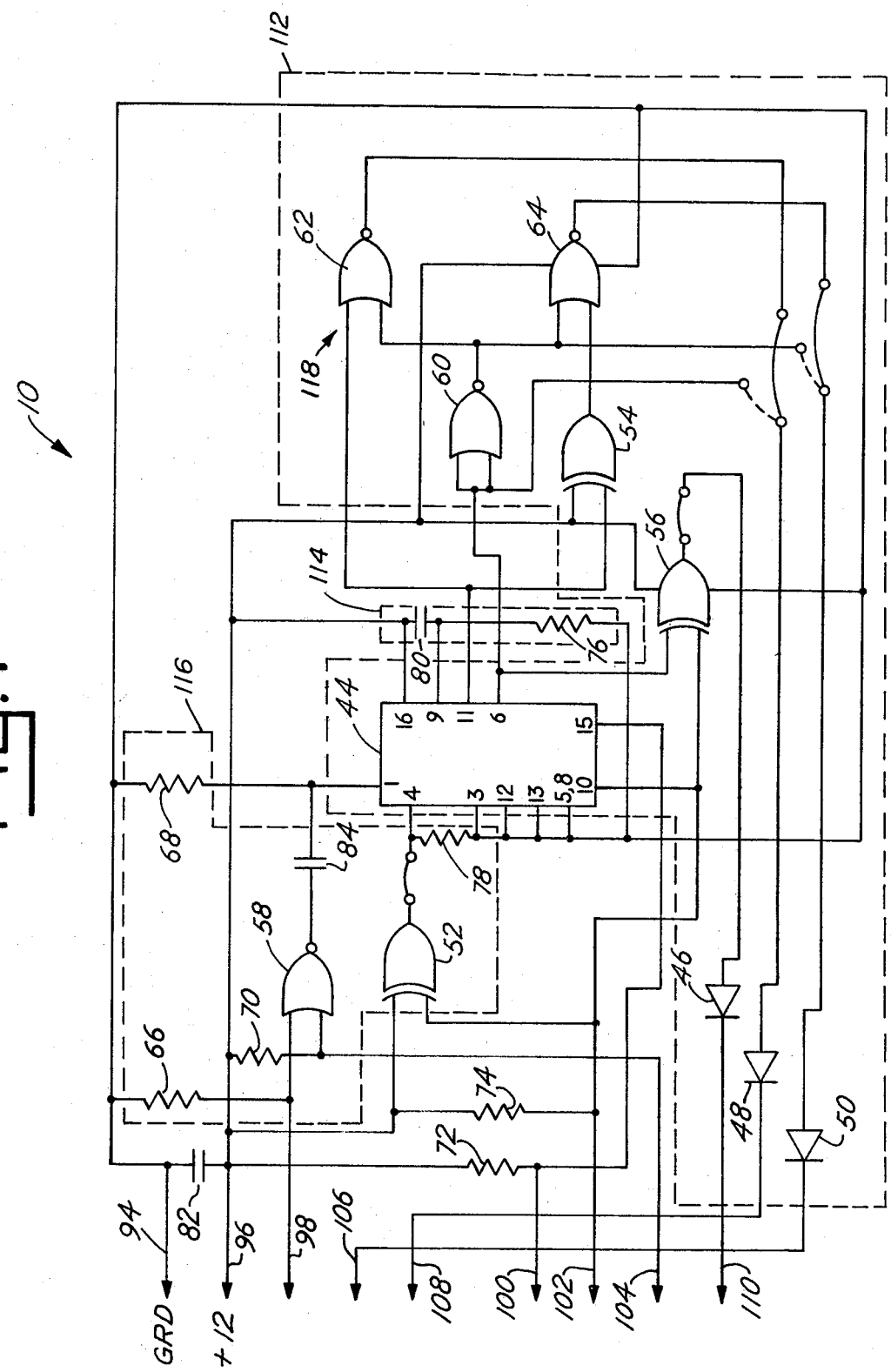

ACCOMMODATION CIRCUIT FOR A STEP MOTOR

BACKGROUND OF THE INVENTION

The present invention relates generally to a step motor and more particularly to an improved drive control circuit for a step motor, i.e., an accommodation circuit for converting to one-phase or half-step operation.

Step motors are used in many applications to provide incremental movement or "stepping". A common application is in electronic typewriters. With depression of a key, the step motor advances the paper-carrying carriage (or the typing mechanism) one step. Depression of the carriage return causes the step motor to rapidly move the carriage (or the typing mechanism) to a "return" position, set by the margin control.

Step motors include a stator and a rotor. As the phase windings of the stator are sequentially energized, the rotor responsively rotates in the prescribed manner. Energization is accomplished by interconnection of the prescribed phase winding with a motor drive supply. This interconnection is sequentially controlled by a logic sequencer in response to a clock. The logic sequencer provides a series of energization signals, and the power drivers, respectively associated with each winding, responsively interconnect the windings and the motor drive supply.

Normal operation of the step motor is two-phased. That is, each stator winding is sequentially energized for two clock periods and de-energized for the following two clock periods. However, in various applications of a step motor, it is desirable to convert the energization pattern and thereby change the operational mode of the step motor. The two primary alteratives are one-phase and half-step operation.

SUMMARY OF THE INVENTION

In a principal aspect, the present invention is an accommodation circuit for a step motor of the type operationally controlled by a clock, logic sequencer and a series of power drivers, each associated with a winding of the stator. The accommodation circuit converts the typical or common two-phase ON operation to one-phase ON or half-step operation.

The accommodation circuit includes an initialization subcircuit, a sequence-matching subcircuit and a conversion subcircuit. With start-up, the conversion subcircuit is initialized or pre-set by the initialization subcircuit. The conversion subcircuit is then sequentially-matched with the logic sequencer by and through the sequence-matching subcircuit.

In response to the clock, the conversion subcircuit provides a series of override signals received by the power drivers. The sequentially-matched override signals and energization signals, received by the power drivers from the accommodation circuit and logic sequencer, respectively, are combined to modify the energization pattern. In a first operational state, the energization pattern becomes one-clock period ON, three-clock periods OFF.

In a second operational or half-step state, the converted pattern is three-clock periods ON, five-clock periods OFF. Here the accommodation circuit further includes a feedback subcircuit coupled to the logic sequencer. Again in response to the clock, the conversion subcircuit provides override signals to the power drivers. Additionally the conversion subcircuit provides a state change inhibit signal to the feedback subcircuit. In response thereto, the feedback subcircuit alters the energization signals provided by the logic sequencer.

In a particular aspect hereof, the pattern is initially altered to a four-clock period ON, four-clock period OFF pattern. This pattern is then converted by operation of the conversion subcircuit, in conjunction with the power drivers, to provide the half-step energization pattern, i.e., three-clock periods ON, five-clock periods OFF.

It is thus an object of the present invention to provide an improved drive control circuit for a step motor whereby the energization pattern is modifiable. Another object is an improved drive control circuit whereby the energization pattern is convertible from a two-phase ON to a one-phase ON or a half-step pattern. Still another object is an accommodation circuit for a step motor whereby the energization signal, provided by the logic sequencer, is selectably modified by a series of override signals sequentially-matched to the energization signals.

It is also an object of the present invention to provide an optional circuit for incorporation into the control electronics of a step motor whereby alternative modes of operation are available. A further object is an accommodation circuit, operable in one of two states, for converting the typical two-phase ON step motor drive sequence into either a one-phase ON or a half-step drive sequence.

These and other features, objects and advantages of the present invention are described or apparent in the following detailed description.

BRIEF DESCRIPTION OF THE DRAWING

A preferred embodiment of the present invention is described below, in detail, with reference to the drawing wherein:

FIG. 1 is a schematic diagram of a step motor and its associated electronic control circuitry which includes a preferred embodiment of the present invention;

FIG. 2 is a detailed schematic diagram of the logic sequencer shown in FIG. 1, partially illustrating the preferred embodiment shown in FIG. 1;

FIG. 3 is a detailed schematic of the power driver shown in FIG. 1;

FIG. 4 is a partial, detailed schematic diagram of the preferred embodiment shown in FIG. 1.

DETAILED DESCRIPTION OF A PREFERRED EMBODIMENT

Figure 5:
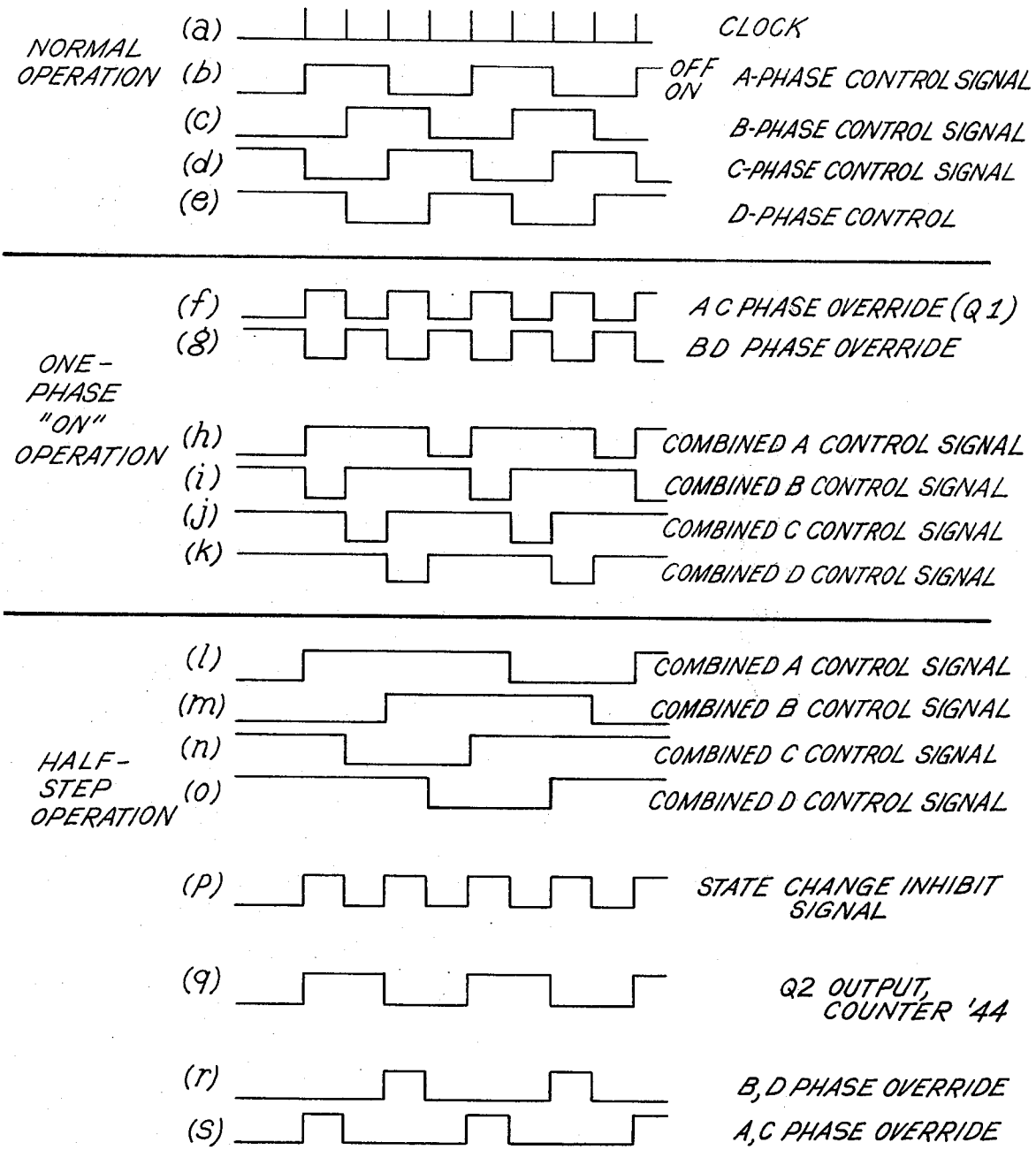
FIG. 5 illustrates a series of voltage waveforms related to the operation of the preferred embodiment shown in FIGS. 1, 2 and 4.

Referring to FIGS. 1-4, a preferred embodiment of the present invention is shown as an accommodation circuit 10, incorporated into the control electronics, generally designated 12, for a step motor 14. As well known in the art, the step motor 14 includes a stator 16 and rotor 18, electromagnetically coupled to the stator 16. The stator 16 includes a series of windings, designated A, B, C, D in FIG. 2.

The control electronics 12 includes a clock 20, logic sequencer 22 and power driver 24, interconnected as shown. The circuitry of the power driver 24 is shown in FIG. 3, and as well known in the art, there is a power driver 24 associated with each winding A, B, C, D of the stator 16. Only a single power driver 24 is shown in FIG. 1 for clarity.

Operationally, the logic sequencer 22, in response to clock pulses received from the clock 20, sequentially energizes the windings A, B, C, D of the stator 16, such that the rotor 18 moves or is sequenced through a predetermined pattern. More particularly, the logic sequencer 22 provides energization signals, received by the respective power drivers 24 and defining an energization pattern.

The noral mode of operation for the step motor 14, i.e., the normal energization pattern, is two-phase ON. Therein the logic sequencer 22 causes energization of the stator windings A, B, C, D for successive, overlapping times equal to two clock pulses. Normal two-phase ON operation, for clockwise movement, is illustrated in FIG. 5(a)–(e). As shown, the normal energization signals include an A, B, C and D phase control signal, received from the logic sequencer 22 by the power drivers 24 associated with the windings A, B, C, D, respectively.

Referring to FIG. 2, the logic sequencer 22 includes a direction control 26, a pair of steering networks 26A, 26B, and a pair of flip-flops 28, 30, interconnected as shown. The direction control 26 is a manually set control and provides a direction control signal to the steering networks 26A, 26B, which have inputs connected to the Q and Q outputs of the flip-flops 28, 30, respectively. In this preferred embodiment, the direction control signal is a "0" for clockwise motion and a "1" for counterclockwise motion.

Responsive to a "0", the steering network 26A passes the Q output signal of the flip-flop 28 to the control input of the flip-flop 30, and the steering network 26B passes the Q output signal of the flip-flop 30 to the flip-flop 28. The opposite signals are passed by the steering networks 26A, 26B in response to a counterclockwise "1". When the direction control 26 provides the "0" control signal, the flip-flops 28, 30, in response to the clock 20, provide the energization pattern shown in FIG. 5(b)–(e).

The flip-flop 28 controls energization of the windings A, C via its output terminals Q and Q, respectively. That is, the A, C phase control signals are derived from the Q and Q terminals of the flip-flop 28. Likewise, the flip-flop 30 controls energization of the windings B, D via its output terminals Q, Q, respectively.

The output terminals of the flip-flops 28, 30 are respectively connected to the power drivers 24, associated with the stator windings A, B, C, D. As shown in FIG. 3 for winding A, the power drive 24 includes a motor power supply 32, a control transistor 34, darlington-connected power transistors 36, 38, and resistors 40, 42, interconnected as shown. In response to the energization signal from the logic sequencer 22, the control transistor 34 periodically becomes nonconductive, causing the power transistors 36, 38 to conduct and interconnect the winding A of the stator 16 with the motor power supply 32. As best shown in FIG. 5(b)–(e), the control transistor 34 is non-conductive when the received energization signal is a "0" or LOW in digital terminology.

The accommodation circuit 10 permits conversion of the operational mode of the step motor 14 from normal two-phase ON operation to (i) one-phase ON operation or (ii) half-step operation. That is, the accommodation circuit 10 is operable in two states, a first for conversion to one-phase ON operation and a second for conversion to half-step operation.

Referring to FIG. 4, the accommodation circuit 10 includes a binary up/down counter 44 (preferably type CD 4516), diodes 46, 48, 50, exclusive OR gates 52, 54, 56, NOR gates 58, 60, 62, 64, resistors 66, 68, 70, 72, 74, 76, 78, and capacitors 80, 82, 84, interconnected as shown. In the first operational state, the dashed-line jumpers are in place: in the second or half-step operational state, the solid-line jumpers are in place. Referring to FIG. 2, the accommodation circuit 10 further includes feedback resistors 86, 88 and inverters 90, 92, interconnected as shown. The feedback resistors 86, 88 and inverters 90, 92 are operative only in the half-step conversion state. In this preferred embodiment, the inverters 90, 92 are operable in a low-impedance, or passing, mode and a high-impedance, or blocking, mode depending upon the signal present at the control terminals 90A, 92A, respectively.

Referring again to FIGS. 2–4, the accommodation circuit 10 includes input terminals 94, 96, 98, 100, 102, 104 and output terminals 106, 108, 110. The input terminal interconnections are:

| INPUT TERMINAL | CONNECTION |
| --- | --- |
| 94 | Ground |
| 96 | 12 Volt Supply |
| 98 | Q Output, Flip-Flop 28 |
| 100 | Clock 20 |
| 102 | Directional Control 26 |
| 104 | Q Output, Flip-Flop 30 |

The output terminal interconnections are:

| OUTPUT TERMINAL | CONNECTION |
| --- | --- |
| 106 | Base, Transistors 34, Windings A, C |
| 108 | Base, Transistors 34, Windings B, D |
| 110 | Inverters 90, 92 |

In this preferred embodiment, the accommodation circuit 10 includes conversion means, initialization means and sequence-matching means, generally designated 112, 114, 116, respectively, in FIG. 4. The conversion means 112 includes the counter 44, diodes 46, 48, 50, and gate means, generally designated 118 and defined by the exclusive OR gates 54, 56 and the NOR gates 60, 62, 64. The diode 46 and the gates 54, 62, 64 are only operable during the second or half-step conversion state.

The resistor 76 and capacitor 80 cooperate to define the initialization means 114. The sequence-matching means 116 is defined by the NOR gate 58, resistors 66, 68, 70, 78, capacitor 84 and the exclusive OR gate 52. The exclusive OR gate 52 is operable only in the half-step conversion state.

In both operational states of the accommodation circuit 10, the initialization means 114 pre-sets or initializes the conversion means 112 upon start-up. There is a momentary "1" provided to the counter 44 (at the reset terminal designated 16 in FIG. 4) until the capacitor 80 discharges through the resistor 76, and the counter 44 responsively pre-sets all outputs to "0".

Likewise in both states, the sequence-matching means 116 sequentially matches the conversion means 112 to the logic sequencer 22. That is, in response to the input signals received at the input terminals 94, 96, 98, 104, the sequence-matching means 116 coordinates the counter 44 with the logic sequencer 22, such that the signals of the conversion means 112, received via the output terminals 106, 108, 110, are in proper sequence with the energization signals provided by the logic sequencer 22. The signals of the conversion means 112 are derived from the terminals of the counter 44, designated "6" and "11" in FIG. 4, through the gate means 118 and diodes 46, 48, 50. The "6" and "11" terminals of the counter 44 are the Q1 and Q2 outputs thereof, as is well known in the art.

In the first operational state for conversion to one-phase ON operation, the conversion means 112 provides a series of first override signals to the power drivers 24 in response to the clock 20. The first override signals are received via the output terminals 106, 108 and include an A, C phase override signal and a B, D phase override signal, shown in FIG. 5(f) and (g), respectively. The combination of the sequentially-matched energization signals from the logic sequencer 22, shown in FIG. 5(b)–(e), and the first override signals from the conversion means 112 is a one-clock period ON, three-clock period OFF control signal for each winding A, B, C, D. The resultant or combined control signals for one-phase ON operation of the step motor 14 are shown in FIG. 5(h)–(k).

In greater detail, the counter 44, responsive to the clock pulses, provides an alternating HIGH/LOW signal at its Q1 terminal. This alternating HIGH/LOW signal has a period corresponding to two clock periods, i.e., HIGH for one clock period, LOW for one clock period. The alternating HIGH/LOW signal, available at the output terminal 108 via the diode 48, is the A, C phase override signal. The inverse thereof, available at the output terminal 106 through the NOR gate 60 and diode 50, is the B, D phase override signal. In this state, the gate means 118 receives the alternating HIGH/LOW signal of the counter 44 and provides the inverse thereof for receipt by the B, D windings of the stator 16.

The alternating HIGH/LOW signal and its inverse are combined with the energization signals, produced by the logic sequencer 22, at the base of the respective control transistors 34, as best shown in FIG. 3. Combining these phase override signals with the phase control signals converts the normal two-phase ON operation of the step motor 14 to one-phase ON operation.

Half-step operation is achieved, in this preferred embodiment, by sequentially energizing each winding A, B, C, D for three clock periods and then de-energizing each for five clock periods. The half-step energization pattern is shown in FIG. 5(l)–(o), respresenting the half-step phase control signals.

In this state, the conversion means 112 provides a series of second override signals to the power drivers 24 and additionally provides a state change inhibit signal to the control terminals 90A, 92A of the inverters 90, 92, respectively. The state change inhibit signal is derived from the Q1 terminal of the counter 44 and the exclusive OR gate 56. The other input to the exclusive OR gate 56 is the direction control signal from the direction control 26.

Conversion to half-step operation is direction dependent, i.e., sequencing or timing is dependent upon the rotational direction of the rotor 18. If counterclockwise, then the directional control 26 provides a "1" and the exclusive OR gate 56 inverts the signal from the counter 44. Inversion does not occur when the direction is clockwise and the direction control 26 provides a "0". The state change inhibit signal received by the inverters 90, 92 for clockwise direction is shown in FIG. 5(p).

The state change inhibit signal, as applied to the inverters 90, 92, causes the inverters 90, 92 to periodically disconnect the steering networks 26A, 26B from the flip-flops 28, 30, and with disconnection, the Q output signals of the flip-flops 28, 30 are fed back through the resistors 86, 88 to the respective control inputs. This feedback causes the outputs of the flip-flops 28, 30 to change only in response to every other clock pulse. As such, the resistors 86, 88 and the inverters 90, 92 cooperate to define feedback means, coupled to the logic sequencer 22 and generally designated 120 in FIG. 2. The feedback means 120 receives the state change inhibit signal from the conversion means 112 and responsively causes the logic sequencer 22 to alter its operation. In this preferred embodiment, altered operation of the logic sequencer 22 provides the four-clock period ON, four-clock period OFF energization pattern.

The second override signals, provided by the conversion means 112, are derived from the Q1 and Q2 terminals of the counter 44 and the gate means 118. In this state, the counter 44 provides first and second alternating HIGH/LOW signals, respectively. The period of the second HIGH/LOW signal is twice the first. The Q1 and Q2 signals are shown in FIG. 5(f) and (q).

The Q1 output signal from the counter 44 is inverted by the NOR gate 60. The inverted Q1 signal is received by the NOR gate 62, where it is gated with the Q2 output signal of the counter 44. The inverted Q1 signal and the Q2 signal, as modified by the exclusive OR gate 54, are inputs to the NOR gate 64.

The outputs of the NOR gates 62, 64 are shown in FIG. 5(r) and (s). These signals are available at the output terminals 108, 106, respectively, and represent the second override signals as received by the power drivers 24. As in the first state operation, the second override signals include A, C phase override signals and B, D phase override signals.

The A, C and B, D override signals are combined with the four-clock period ON, four-clock period OFF energization signals at the base of the respective control transistors 34, as in the case of first state operation. The resulting energization pattern is the three-clock period ON, five-clock period OFF pattern shown in FIG. 5(l)–(o).

The major advantage or benefit of the accommodation circuit 10 is cost savings. The accommodation circuit 10 is an optional attachment to the control electronics 12 of the step motor 14. The control electronics 12 can therefore be mass-produced for conventional two-phase ON operation, without any hardware for conversion to any other operational mode. The cost of conversion to either one-phase ON operation or half-step operation is consequently borne only by those desiring such modes of operation. With presently available step motors 14, the hardware for conversion is included in the control electronics 12, as mass-produced, and is thus a cost to all purchasers, even if unused.

A single preferred embodiment of the present invention has been described herein. It is to be understood, however, that various changes and modifications can be made without departing from the true scope and spirit of the present invention as defined by the following claims, interpreted in light of the foregoing specification.

What is claimed is:

1. An accommodation circuit for use in conjunction with a step motor of the type controlled by a clock, a logic sequencer and a series of power drivers, said logic sequencer providing a series of energization signals, defining an energization pattern, to said power drivers in response to said clock, comprising, in combination:

conversion means, responsive to said clock, for providing a series of override signals to said power drivers for combination with said energization signals to convert said energization pattern to a predetermined alternate pattern;

initialization means for initializing said conversion means; and sequence-matching means for sequentially matching said conversion means to said logic sequencer whereby said override signals are properly coordinated with respect to said energization signals.

2. An accommodation circuit as claimed in claim 1 wherein said override signals include a first override signal received by a first set of said power drivers and a second override signal received by a second set of said power drivers.

3. An accommodation circuit as claimed in claim 1 or 2 wherein said conversion means includes a counter responsive to said clock.

4. An accommodation circuit as claimed in claim 3 wherein said counter is initialized by said initialization means.

5. An accommodation circuit as claimed in claim 3 wherein said counter provides said first override signal.

6. An accommodation circuit as claimed in claim 5 wherein said conversion means further includes gate means, coupled to said counter, for receiving and inverting said first override signal to provide said second override signal.

7. An accommodation circuit as claimed in claim 1 or 6 wherein said predetermined alternate pattern is a one-phase ON pattern.

8. An accommodation circuit as claimed in claim 1 wherein said conversion means further provides a state change inhibit signal.

9. An accommodation circuit as claimed in claim 8 further comprising feedback means, coupled to said logic sequencer, for receiving said state change inhibit signal from said conversion means and responsively causing said logic sequencer to alter operation and thereby provide said energization pattern.

10. An accommodation circuit as claimed in claim 9 wherein said energization pattern is a four-clock period ON, four-clock period OFF pattern.

11. An accommodation circuit as claimed in claim 9 wherein said override signals include a first override signal received by a first set of power drivers and a second override signal received by a second set of said power drivers.

12. An accommodation circuit as claimed in claim 9 or 11 wherein said conversion means includes a counter responsive to said clock.

13. An accommodation circuit as claimed in claim 12 wherein said counter provides a first alternating signal and a second alternating signal in response to said clock.

14. An accommodation circuit as claimed in claim 13 wherein said logic sequencer includes a direction control providing a direction control signal.

15. An accommodation circuit as claimed in claim 14 wherein said conversion means further includes gate means, coupled to said counter and said logic sequencer, for receiving said first alternating signal, said second alternating signal and said direction control signal and for responsively generating said override signals.

16. An accommodation circuit as claimed in claim 9 or 15 wherein said predetermined alternate pattern is a three-clock period ON, five-clock period OFF pattern.

* * * * *